United States Patent [19]

Magers et al.

[11] 4,065,038

[45] Dec. 27, 1977

[54] PUMP SPRAYER

[75] Inventors: Wallace Farnholm Magers, Leawood, Kans.; Larry Lee Hudson; James Phillip Workman, both of Lee's Summit, Mo.

[73] Assignee: Realex Corporation, Kansas City, Mo.

[21] Appl. No.: 674,577

[22] Filed: Apr. 7, 1976

[51] Int. Cl.² .............................................. G01F 11/36
[52] U.S. Cl. ..................................... 222/321; 222/341
[58] Field of Search ............... 222/341, 383, 384, 385, 222/321; 417/450, 470

[56] References Cited

U.S. PATENT DOCUMENTS

| 3,500,761 | 3/1970 | Clevenger et al. | 222/321 X |
|---|---|---|---|
| 3,531,224 | 9/1970 | Clevenger et al. | 222/321 X |
| 3,583,605 | 6/1971 | Corsette | 222/383 X |

Primary Examiner—Stanley H. Tollberg
Attorney, Agent, or Firm—Schmidt, Johnson, Hovey & Williams

[57] ABSTRACT

The reciprocable plunger of the pump has a valve sleeve which circumscribes the plunger and shifts relative to the latter between port opening and port closing positions in response to telescopic depression and extension of the plunger within its receiving barrel. That portion of the plunger circumscribed by the sleeve is necked down and provided with the port that communicates the discharge passage of the plunger with liquid in the barrel. The sleeve is generally hyperbolic in longitudinal cross-section, having an inner surface which is generally complimentally received within the neck of the plunger. A pair of radially outwardly extending, annular steps in such inner surface on opposite sides of the port define a pair of corresponding shoulders on the inner surface that are disposed to engage oppositely tapering sections of the plunger neck during movement of the sleeve between its port opening and port closing positions, thereby to effect such opening and closing of the port. The plunger is of two part construction at its neck, having a detachable tip that serves as a retainer for the sleeve and which is symmetrically constructed so that it may be inverted end-for-end during assembly without adversely affecting the operation of the pump.

2 Claims, 5 Drawing Figures

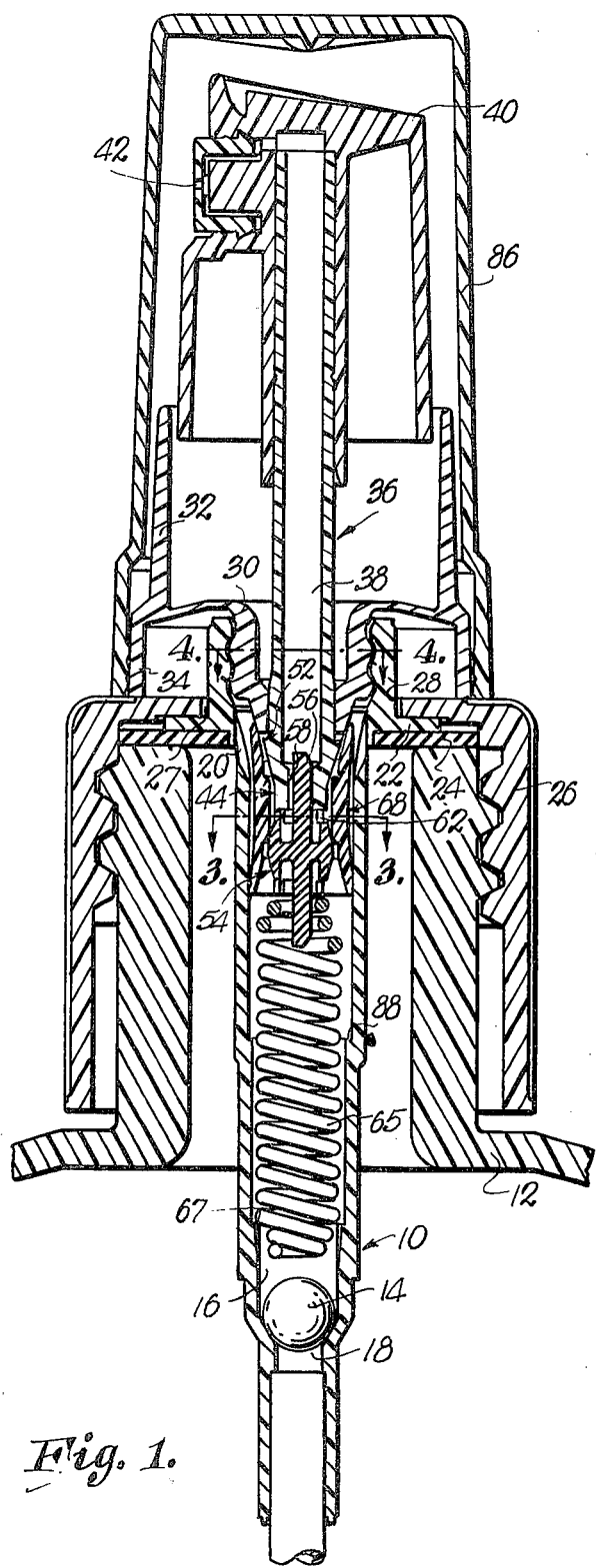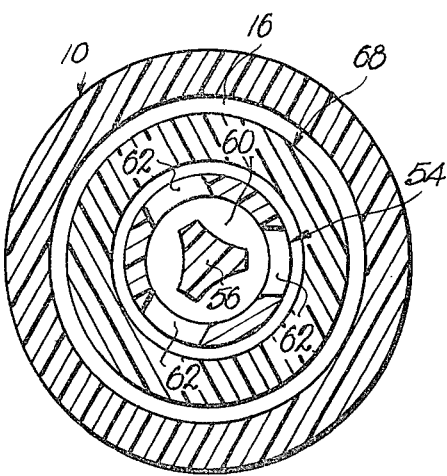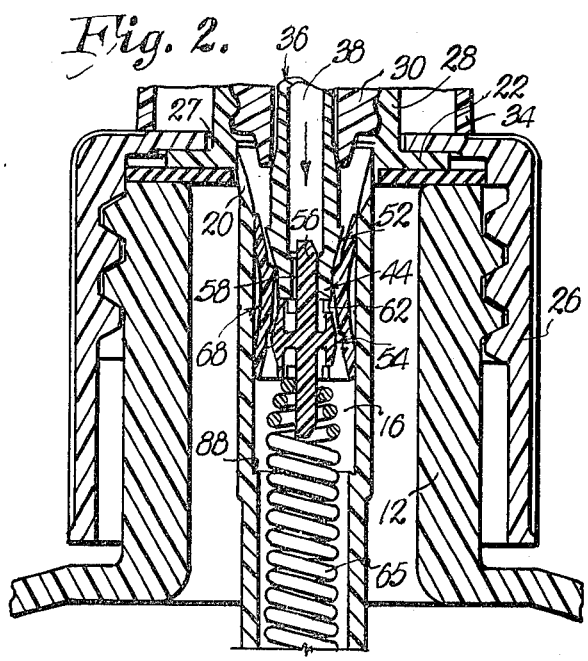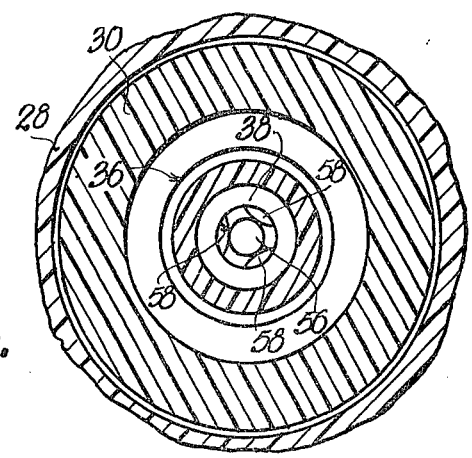
Fig. 1.
Fig. 2.
Fig. 3.
Fig. 4.

PUMP SPRAYER

The present invention relates to liquid hand pumps of the type described and claimed in U.S. Pat. No. 3,531,224 issued Sept. 29, 1970 and owned by the assignee of the present invention. More particularly, this invention relates to an improvement in the principles of the pump of said patent which renders it more reliable in operation, easier to fabricate and assemble, and reducible to a diminutive size for certain specialized uses without exceeding the technical capabilities of present plastic molding procedures.

Hand pumps of the type herein described are of course most advantageously constructed using plastic molding techniques. While relatively large parts of the pump normally present no problems during subsequent use of the pump (because corresponding areas in the molds for these parts can be readily filled by the flowable plastic), some problems may be experienced in those areas where very thin webs or "feather" edges are presented. These areas are exceptionally difficult to fill during the molding process, and it is not entirely uncommon for them to fill incompletely, creating a deformity that can lead to malfunction of the pump.

In the case of the pump of the aforementioned patent, a valve sleeve which surrounds the plunger and is shifted relative to the latter between port opening and port closing positions contains a radially innermost band having an upper annular edge that is snugly received within a complemental sealing groove when the sleeve is in its port opening position on the plunger. This snug relationship between the band and sealing groove is normally sufficient to accomplish a good seal at that point such that no malfunction called "blow-by" occurs there when the plunger is depressed. However, because fine feather edges are presented between the sealing groove and adjacent receiving ports in the plunger, such edges can become incompletely filled during molding such as to enlarge the ports beyond their intended dimensions, thereby inadequately sealing in those critical areas and causing "blow-by". The problem of creating the properly filled feather edge is especially acute where the pump is markedly reduced in size in order to be of use in those situations where only a minute charge of liquid is to be pumped with each depression of the plunger.

On the other hand, the pump of said patent has the highly desirable attribute of being instantly responsive upon depression of its plunger because of the way in which the valve sleeve is maintained out of frictional engagement with the plunger along the length of the sleeve, its sealing engagement with the plunger being accomplished only at the opposite annular ends of the sleeve. This feature must therefore be retained in any improvement, whether the improved pump be larger than, the same size as, or substantially smaller than the pump of said patent.

Accordingly, one important object of the present invention is to provide a improved hand pump which retains the instantaneously responsive virtues of the pump of U.S. Pat. No. 3,531,224 but which alleviates any problems heretofore experienced with "blow-by" caused by defective sealing around a feather edge, thereby permitting the improved pump to be constructed on a drastically reduced scale if desired without sacrificing reliability of operation.

Another important object of the present invention is to improve the design of the valve sleeve of the pump in such a way as to facilitate its assembly, especially the step during which the lower enlarged end of the plunger is forced through the sleeve and the latter is required to expand momentarily in order to accept the plunger.

An additional important object of this invention is to further facilitate assembly of the pump by constructing the lower end of the plunger in the form of a detachable, symmetrical retainer for the valve sleeve, which is itself also symmetrical, whereby such components may be assembled without regard for locating the "proper" end of such components for assembly.

In the drawings:

FIG. 1 is a fragmentary, vertical, cross-sectional view of a hand pump constructed in accordance with the principles of the present invention, the plunger being illustrated in its extended or stand-by position;

FIG. 2 is a fragmentary, vertical, cross-sectional view of the pump in FIG. 1 showing the condition of the components thereof when the plunger is depressed;

FIG. 3 is an enlarged cross-sectional view of the pump taken along line 3—3 of FIG. 1;

FIG. 4 is an enlarged cross-sectional view of the pump taken along line 4—4 of FIG. 1.

Figure 5:
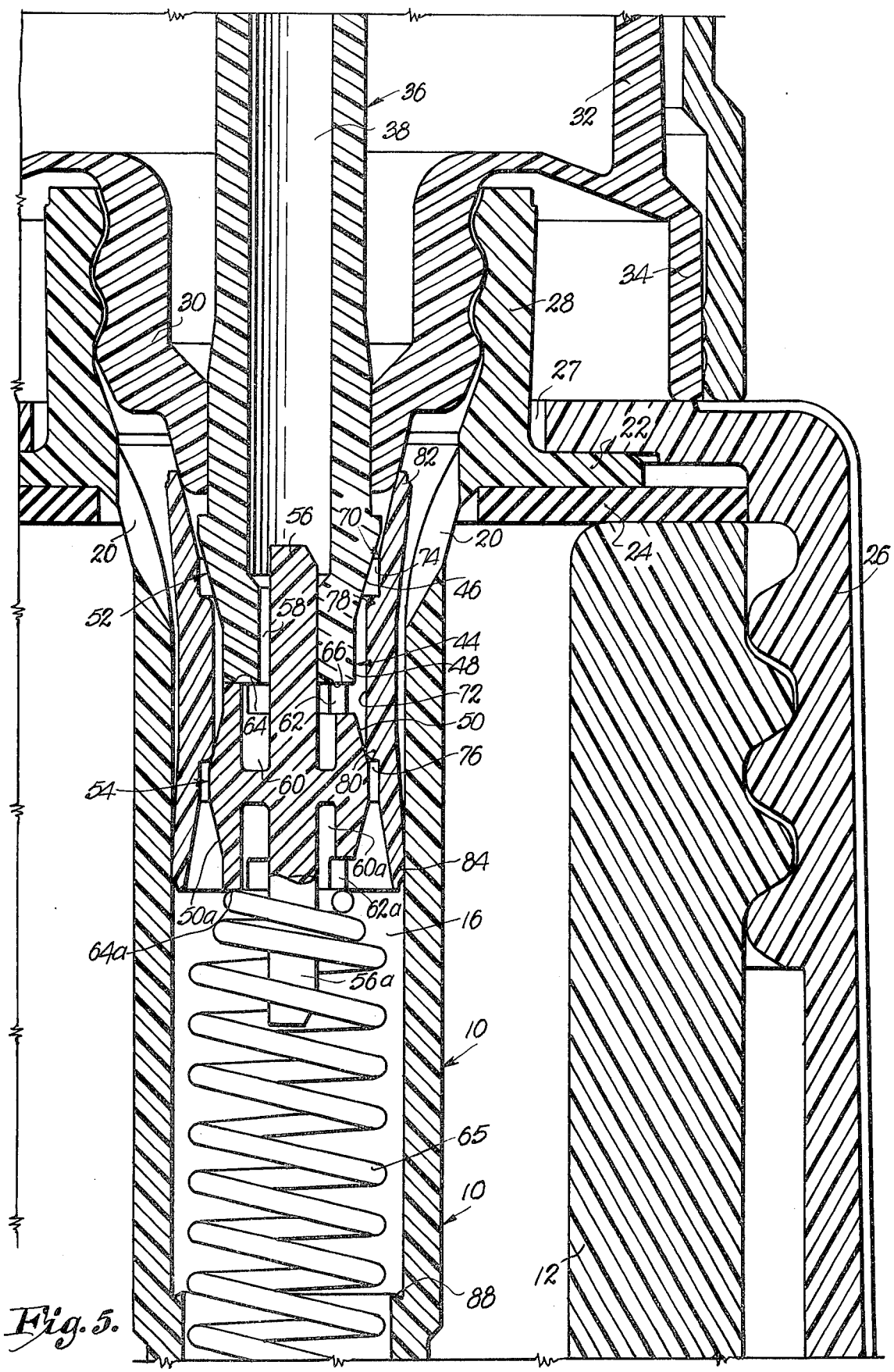
FIG. 5 is a still further enlarged, fragmentary, vertical cross-sectional view of the pump when the latter is in its FIG. 1 condition.

The hand pump illustrated in the drawings has a tubular barrel 10 that projects downwardly into a container 12 filled with liquid to be pumped. A ball check valve 14 at the lower end of the internal chamber 16 of barrel 10 controls opening and closing of a liquid receiving port 18, while vents 20 in the barrel 10 adjacent its upper end admit air to the container 12 during the time that liquid is pumped out of the latter, thereby preventing collapse of the walls of the container. An annular flange 22 integral with barrel 10 extends laterally outwardly from the latter above a gasket 24 that overlies the container 12, and a centrally apertured cap 26 threaded onto a container 12 clamps the flange 22 against gasket 24.

The barrel 10 is also provided with an upstanding, annular boss 28 rising from flange 22 through the aperture 27 of cap 26. The interior of boss 28 is configured complementally to the exterior of an annular collar 30 such that the latter is co-axially received in mating relationship within boss 28. Integral with the collar 30 and spaced radially outwardly therefrom is an upright cylinder 32 and a depending cylinder 34, the latter bearing against the cap 26 when collar 30 is threaded in place within the box 28.

A tubular plunger 36 having a central passage 38 extends into the barrel 10 through the collar 30 for reciprocable movement toward and away from the port 18. The plunger 36 has a discharge head 40 exteriorly of the barrel 10 which is in turn provided with a discharge orifice 42 communicating with the passage 38.

Adjacent its lower end, the plunger 36 is provided with a neck 44 of diametrically reduced dimensions with respect to the remainder of plunger 36. The neck 34 includes a radially inwardly tapering section 46, a section 48 of constant diameter, and a radially outwardly tapering section 50 below section 48. This area of the plunger 36, i.e., the neck 44, is of two-part construction, having a first part 52 that contains the section 46 and a portion of the section 48, and a second part 54 that contains the section 50 and the remainder of the section 48. Part 54 is attached to part 52 by a fluted stem 56 that projects up into the passage 38 and is frictionally held thereby, the flutes of the stem 56 presenting a series of liquid flow channels 58 between the stem 56 and the interior surface of the passage 38.

The stem 56 rises from an annular recess 60 that encircles stem 56, and series of circumferentially spaced notches 62 through the top face 64 of part 54 communicates recess 60 with the chamber 16. Notches 62 thereby serve as liquid inlet openings to the passage 38 of the plunger 36. The lower, transversely extending, annular face 66 of the first part 52 abuts the proximal upper face 64 of part 54 to close the top of notches 62 and thereby force liquid entering the passage 38 from chamber 16 to flow laterally inwardly through notches 62 and thence upwardly through the channels 58 to the passage 38.

The opposite end of the parts 54 is configured identically to the upper end thereof, being symmetrical in all respects thereto. Thus, the lower end of part 54 includes a radially tapering section 50a, a fluted stem 56a, a recess 60a, notches 62a and annular face 64a. By virtue of this construction, the part 54 may be inverted end-for-end during assembly without regard to which end must be inserted into the passage 38. A compression spring 65 between part 54 and an annular ledge 67 above the ball check valve 14 yieldably biases the plunger 36 toward its fully extended position of FIG. 1.

An invertible valve sleeve 68 encircles the plunger 36 at its neck 44 and serves to open and close the inlet notches 62 during the pumping action. Sleeve 68 is generally hyperbolic in longitudinal cross-section, having a radially inwardly bowed inner surface 70 that is generally complemental to the neck 44. That length of surface 70 between oppositely tapering sections 46 and 50 of the neck 44, identified by the numeral 72, is of constant diameter and is spaced radially outwardly from the corresponding constant diameter section 48 of plunger 36 so that there is no frictional wiping engagement between the sleeve 68 and the plunger 36 in this area.

A pair of annular, radially outwardly extending steps 74 and 76 in surface 70 at opposite ends of the constant diameter length 72 define corresponding shoulders 78 and 80 respectively that are disposed for alternate sealing engagement with the corresponding tapering sections 46 and 50 during pumping. Because the constant diameter length 72 is shorter than the distance between sections 46 and 50 at the radial location of length 72, both shoulders 78 and 80 do not seal simultaneously, but rather engage their respective sections 46 and 50 alternately during the pumping cycle.

The hyperbolic cross-sectional appearance of the sleeve 68 is created at least in part by outwardly flaring, annular skirts 82 and 84 at opposite ends of the sleeve 68. Both skirts 82 and 84 frictionally wipe the interior wall of barrel 10 during pumping, and the upper skirt 82 spreads to receive the proximal portion of collar 30 when the plunger 36 is fully extended as illustrated in FIG. 1. In this position, therefore, the skirt 82 effectively closes the vent 20. As clearly illustrated, the sleeve 68 is symmetrical with respect to its transverse center line so that, during assembly, sleeve 68 may be dropped into the barrel 10 without regard for which skirt 82 or 84 is inserted first.

The pump is placed in use after removing a cover cap 86 than fits over the head 40, at which initial time the pump is in the condition illustrated in FIG. 1. Note at this time that the shoulder 80 of sleeve 68 sealingly engages the section 50 of part 54, urged into such position by the coil spring 67 pushing plunger 36 upwardly, the frictional drag between skirt 84 and the barrel 10, and the snug, sealing engagement between the collar 30 and the skirt 82. Inlet notches 62 are therefore closed at this time.

Upon depression of the plunger 36 as illustrated in FIG. 2, however, plunger 36 is immediately displaced relative to sleeve 68 because the latter momentarily remains stationary as a result of its frictional engagement with the barrel 10 at skirt 84. The result, therefore, is an immediate opening of the notches 62 as the section 50 moves downwardly with respect to the shoulder 80, thereby providing a flow path for liquid in chamber 16 to reach the notches 62. When downwardly moving section 46 strikes the shoulder 78, further depression of the plunger 36 causes the latter and sleeve 68 to move in unison toward the port 18, thereby pumping liquid from the chamber 16 into the passage 38 and out the discharge orifice 42.

Since the spring 67 has been compressed during the depression stroke of the plunger 36, removing downward force from the top of head 40 allows the spring 67 to return the plunger 36 upwardly to its original position. However, inasmuch as the skirts 82 and 84 of the sleeve 68 engage the barrel 10, the sleeve 68 momentarily remains behind as the plunger 36 moves upwardly. This delay reseats the shoulder 80 against section 50 to close the inlet notches 62 so that the plunger 36 and sleeve 68 thereupon move upwardly in unison until reaching their original positions. This return stroke of the plunger 36 and sleeve 68 creates a negative pressure within the chamber 16 such as to unseat the ball check valve 14 and draw a fresh charge of liquid from the container 12 into the chamber 16 in preparation for the next pumping cycle.

In these operational respects, the pump of the present invention is quite similar to that of the previously discussed U.S. Pat. No. 3,531,224, in both instances there being no wiping engagement between the valve sleeve and plunger such that instantaneous opening and closing of the various ports and vents is obtained throughout the pumping cycle. However, it is to be noted in the present invention that this special action is obtained without resorting to any difficult-to-form "feather edges". In particular, it is to be emphasized that the walls of the parts 52 and 54 in the area adjacent inlet notches 62 are relatively thick such that there is virtually no tendency at all for the notches 62 to be larger than their intended size, such being a problem where ports are bounded by feather edges. The two-part construction of the plunger 36 in the neck area 44 is of significance here because the separate molds used for the two parts 52 and 54 can be more readily filled in the areas corresponding to the walls around notches 62 than might be the case if parts 52 and 54 were integrally attached to one another.

The location of notches 62 within the constant diameter section 48 of the plunger neck 44 also contributes to functional reliability because the notches 62 are remote from the opposite sealing points defined by the shoulders 78 and 80 of sleeve 68. Any slight variation, therefore, in the size of notches 62 has no effect upon the quality of seal made by the shoulders 78 and 80.

The design of the present pump also entirely eliminates the radially innermost sealing band found on the valve sleeve of the aforesaid patent. Instead of sealing close to the inlet notches 62 and, relatively speaking, the longitudinal axis of the plunger 36 as in said patent, the sleeve 68 seals against the plunger 36 considerably further radially outwardly. This enables the plunger to be thicker in the critical neck area 44 such as to reduce the likelihood of incurring feather edge problems, and also permits the sleeve 68 itself to be relatively thinner. This latter feature becomes important during assembly of the pump when the sleeve 68 is installed on the plunger 36 with its retainer part 54 already attached. There must, of course, be an interference fit between the sleeve 68 and the part 54 if the latter is to retain sleeve 68 during the pumping action, but this means the sleeve 68 must expand to accept the part 54 as the latter is pushed therethrough during assembly. The sleeve 68 is dropped into barrel 10 and then the plunger 36 is inserted. By depressing the plunger 36, the sleeve 68 is forced down in barrel 10 until it strikes ledge 88, whereupon further depression causes part 54 to slip through sleeve 68. By making the sleeve 68 relatively thinner through its midsection of smallest diameter, its ability to expand during the "force fit" installation onto the plunger 36 is increased, thereby decreasing the chances of damage to critical components.

It should also be noted that by having the lower shoulder 76 of sleeve 68 spaced proportionately further outwardly from the central axis of the plunger 36 than in the past, and by having such shoulders 76 at the same radial location as the upper shoulder 74, the diameter of the part 54 at its largest point can be proportionately increased as well. This gives rise to proportionately thicker walls on the part 54 in the area defining the recess 60 and the notches 62, all of which contribute to precise, dimensionally stable plastic molding techniques which in the end contribute to the functional reliability of the pump.

Having thus described the invention, what is new and desired to be secured by Letters Patent is:

1. In a hand pump having a tubular plunger and a coaxial valve sleeve on the plunger shiftable freely between port opening and port closing positions in response to relative movement between the plunger and a barrel that telescopically receives the plunger and sleeve in frictional engagement with the sleeve, the improvement comprising:

said plunger having a neck encircled by said sleeve and said neck being of diametrically reduced dimensions with respect to the remainder of the plunger, said neck including a radially inwardly tapering section at one end thereof and a radially outwardly tapering section at the opposite end thereof, there being a receiving port in the neck between said sloping sections thereof for communicating the inside of the plunger with the barrel when the sleeve is in its port opening position, said sleeve being generally hyperbolic in longitudinal cross section, having a radially inwardly bowed inner surface that is generally complemental to the neck of the plunger, said inner surface of the sleeve having a pair of radially outwardly extending, annular steps therein on opposite sides of said receiving port, presenting a pair of shoulders at the radially inward extent of said steps in position for alternate sealing engagement with the corresponding tapering sections of said neck as the sleeve moves between its port opening and port closing positions, said plunger being of mutually detachable two-part construction at said neck, a first of said parts containing said inwardly tapering section of the neck and the second of said parts containing said outwardly tapering section of the neck, said receiving port being located in said second part, said first part being provided with a first transversely extending annular end face circumscribing the tubular passage of the plunger, said second part being provided with a second transversely extending, annular end face abutting said first face in coaxial registration therewith and circumscribing a recess in the second part, said receiving port comprising a notch through said second face that communicates said recess with the exterior of the plunger, said second part being provided with a fluted stem projecting out of said recess and into the passage of the plunger, said stem being frictionally retained by said passage, said second part being provided with an alternative symmetrical set of outwardly tapering section, second annular face, receiving port notch, recess, and fluted stem opposite the aforementioned corresponding components such that said second part may be inverted end-for-end during assembly of the two parts.

2. In a hand pump as claimed in claim 1, wherein the inner surface of the sleeve between said shoulders is of constant diameter.

* * * * *